June 23, 1925.
J. L. DRAKE
1,543,428
AUTOMATIC DIRIGIBLE AUTOMOBILE HEADLIGHT
Filed Aug. 16, 1924
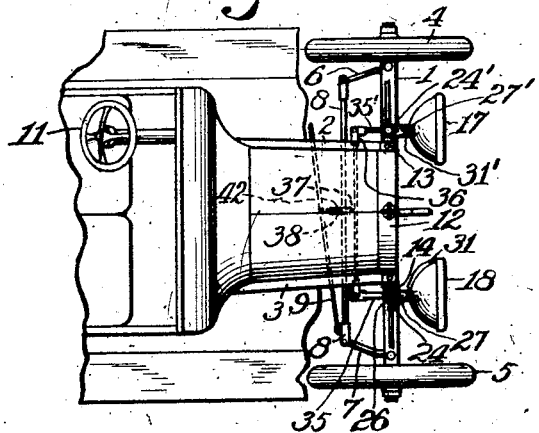
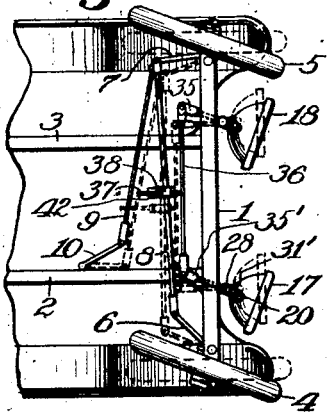
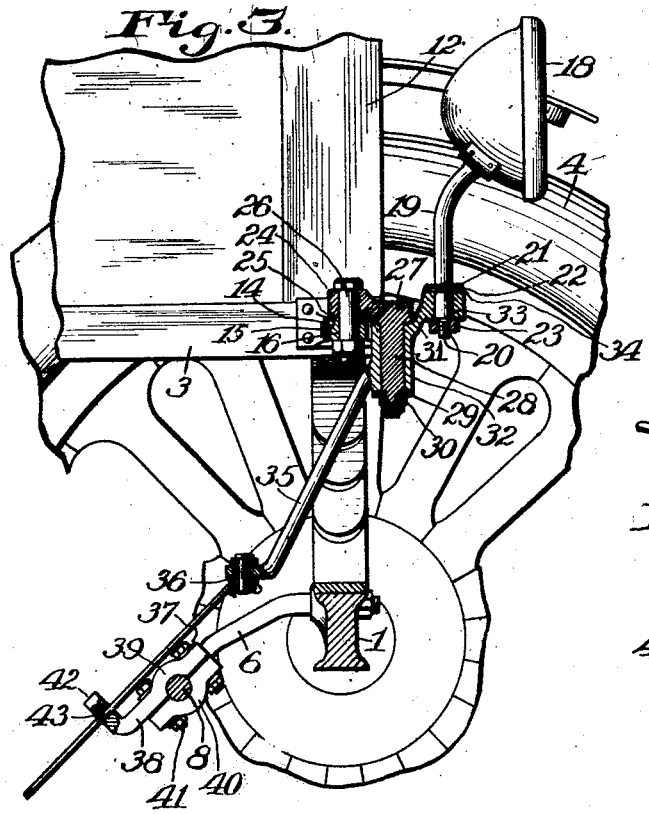
INVENTOR:
John L. Drake,
BY E. D. Silvius,
ATTORNEY.

Patented June 23, 1925.

1,543,428

UNITED STATES PATENT OFFICE.

JOHN L. DRAKE, OF INDIANAPOLIS, INDIANA.

AUTOMATIC DIRIGIBLE AUTOMOBILE HEADLIGHT.

Application filed August 16, 1924. Serial No. 732,466.

*To all whom it may concern:*

Be it known that I, JOHN L. DRAKE, a citizen of the United States, residing at Indianapolis, in the county of Marion and State of Indiana, have invented a new and useful Automatic Dirigible Automobile Headlight, of which the following is a specification, reference being had to the accompanying drawings and to the letters and figures of reference marked thereon.

This invention relates to lamps of the type that are used on the forward portion of motor-vehicles of such construction as to enable them to be steered on roads, the invention having reference more particularly to mountings and controlling apparatus for motor-vehicle headlights that are adapted to be turned automatically as the guiding wheels of the motor-vehicle are turned under control of a steering wheel.

An object of the invention is to provide improved mountings and controlling apparatus, for motor-vehicle headlights, of such construction as to not be costly and which may be readily applied for practical use, and shall be adapted to be easily operated so as to control a pair of lamps easily and reliably.

Another object is to provide improved mountings that shall be so constructed as to be adapted to be applied to existing motor-vehicles having lamps fixed thereon to render the lamps movable and controllable on the motor-vehicle, to afford advantages when driving at night time which results from the lighting of the road ahead, especially when the motor-vehicle is turning into cross roads or is passing around other vehicles.

A further object is to provide simple and reliable lamp mountings for a popular type of automobile, to be readily applied without alteration of structure or the use of special tools, to adjustably support the standard lamps by means of the basic supports originally provided for relatively stationary lamps.

With the above-mentioned and other objects in view, the invention consists in a novel lamp-supporting arm having a novel head bar adapted to be rigidly supported and to pivotally support the arm, the arm being provided with controlling means of novel construction; and, the invention consists also further in the novel parts and combinations and arrangements of parts as hereinafter particularly described and furthermore definitely claimed.

Referring to the drawings, Figure 1 is a fragmentary top plan of an automobile to which the invention is applied; Fig. 2 is a bottom plan of the principal portion of Fig. 1 in which the lamps and the controlling apparatus thereof appear in different positions; Fig. 3 is a fragmentary sectional elevation of the automobile on an enlarged scale showing especially a vertical central section of the improved lamp mounting and controlling apparatus; Fig. 4 is a perspective view of one of a pair of lamp mountings constructed substantially in accordance with the invention; and Fig. 5 is a perspective view of an assembly whereby the dirigible lamps are connected with a part of an automobile steering apparatus.

Similar reference characters in the different figures of the drawings indicate corresponding elements or features of construction herein referred to in detail.

The invention as illustrated for descriptive purposes being designed more particularly for use on existing motor-vehicles of a class that is most commonly used, the invention is shown as applied to such a motor-vehicle which is understood to have a front axle bar 1 suitably supporting a frame having side bars 2 and 3, the axle bar being carried by forward guiding wheels 4 and 5 that are directly mounted on steering knuckles provided with controlling arms 6 and 7 respectively that are connected to a coupling rod 8, being provided with a controlling rod 9 that is connected to a lever arm 10 mounted on a steering shaft as usual to which a steering wheel 11 is connected. A radiator 12 is carried by the forward end of the frame.

Commonly the forward portions of the frame bars 2 and 3 have lugs 13 and 14 suitably fixed thereto respectively, adjacent to the radiator, the top of each lug having a key groove 15 therein, and a lug having a vertical bolt hole 16, the lugs being designed to directly support a pair of lamps 17 and 18, each mounted upon a standard 19 having a shank portion 20 that is customarily secured rigidly in the bolt hole 16, the standard having a collar 21 seated upon the lug and having a key rib 22 on the under side thereof that is arranged in the key groove to prevent rotation of the standard which is further secured in place by means of a nut 23, so that the standard may be readily removed from the lug after removal of the nut.

The improved lamp mountings comprise two head bars to be secured to the lugs on the motor-vehicle frame, one head bar having a base portion 24 and the other one having a similar base portion 24', the lower face of each base portion having a key rib or projection 25 that enters the key groove 15 in the lug upon which the base portion is directly supported and secured by means of a bolt 26 arranged in the bolt hole 16. The head bars have also pivot portions 27 and 27' respectively, to which arms to support the lamps are suitably pivoted, for which purpose each pivot portion preferably is provided with a stub shaft 28 projecting from its normally lower face, the shaft having a bearing collar 29 and a nut 30 secured thereto or other device if desired such as a bolt head, it being permissible to use a bolt rigidly secured to the portion 27 to constitute the stub shaft. Two lamp arms 31 and 31' are provided for carrying the respective lamps, the arms being alike and having each a long hub 32 integral therewith, the hub being rotatively mounted on the stub shaft. Each arm has a vertical bore 33 therein to receive the shank 20 of a lamp standard, and the upper face of the arm has a key groove 34 to receive the key rib 22 of the standard. Thus the lamp standards are carried slightly forward of their former positions at the sides of the radiator. Each hub 32 has a lever arm 35 or 35' integrally connected thereto, each arm extending downwardly and rearwardly, the lever arm being much longer than the lamp arm so as to reach across the axle bar 1. A yoke is provided which comprises a connecting rod 36 that is pivoted to the lever arms 35 and 35' and has a lug finger 37 rigidly connected thereto whereby to move and control the yoke.

A coupler is provided which comprises a main plate 38 having a curved bearing portion 39 adapted to be seated stationarily on the coupling rod 8, and a clamp plate 40 secured by means of bolts 41 to the main plate whereby the coupler is rigidly clamped to the rod 8, the main plate 38 having a relatively angular lug ear 42 thereon that has an aperture 43 through which the lug finger 37 loosely extends.

In practical use the lamps are moved or readjusted automatically in synchronism with the guiding front wheels of the motor-vehicle in response to the steering operations, so that the headlights must always light the roadway ahead of the motor-vehicle whether moving straight or turning on the road.

What is claimed as new is:

1. A lamp mounting and controlling apparatus including a plurality of head bars having each a base portion and a pivot portion, each base portion having a securing bolt therein, a plurality of lamp-supporting arms pivotally connected to the pivot portions of the head bars respectively and having each a bore to receive a lamp standard, each arm having a lever arm fixed thereto at an inclination relatively to the bore, a yoke pivoted to the lever arms and having a lateral lug finger rigidly fixed thereto, and a coupler comprising a clamp having a lug ear loosely receiving the lateral lug finger of the yoke.

2. In an automatic dirigible automobile headlight, the combination with a plurality of relatively stationary normally vertical stub shafts, of a plurality of hubs rotatively supported on said shafts respectively, each hub having a lamp arm fixed to one side adjacent to the normal upper end thereof and a relatively longer lever arm fixed to the opposite side of the hub adjacent to the opposite lower end thereof, a yoke comprising a coupling rod and a lug finger rigidly fixed to one side of the rod, the coupling rod being pivotally connected to said lever arms, and a coupler comprising a clamp adapted to be rigidly secured to a steering element and being provided with a lug ear through which said lug finger loosely extends.

In testimony whereof, I affix my signature on the 6th day of August, 1924.

JOHN L. DRAKE.